US012047786B2

(12) United States Patent
Sayeed et al.

(10) Patent No.: US 12,047,786 B2
(45) Date of Patent: Jul. 23, 2024

(54) CONTINUOUSLY ONLINE 5G RADIO UNIT SYSTEMS AND METHODS

(71) Applicant: DISH Wireless L.L.C., Englewood, CO (US)

(72) Inventors: Zulfiquar Sayeed, East Windsor, NJ (US); Farhad Bassirat, Arlington, VA (US); Premchand Chandran, Ashburn, VA (US); Dhaval Mehta, Aldie, VA (US); Tao Yu, Broadlands, VA (US); Sang Boh Yun, Ashburn, VA (US)

(73) Assignee: DISH Wireless L.L.C., Littleton, CO (US)

( * ) Notice: Subject to any disclaimer, the term of this patent is extended or adjusted under 35 U.S.C. 154(b) by 199 days.

(21) Appl. No.: 17/544,657

(22) Filed: Dec. 7, 2021

(65) Prior Publication Data

US 2022/0191707 A1    Jun. 16, 2022

Related U.S. Application Data

(60) Provisional application No. 63/123,898, filed on Dec. 10, 2020.

(51) Int. Cl.
*H04W 16/18* (2009.01)
*H04W 40/04* (2009.01)
*H04W 88/08* (2009.01)

(52) U.S. Cl.
CPC ........... *H04W 16/18* (2013.01); *H04W 40/04* (2013.01); *H04W 88/08* (2013.01)

(58) Field of Classification Search
CPC ........... H04W 4/14; H04W 4/60; H04W 4/12; H04L 51/04; H04L 67/02
See application file for complete search history.

(56) References Cited

U.S. PATENT DOCUMENTS

| 2003/0092438 A1* | 5/2003 | Moore ................ H04W 84/025 455/423 |
| 2018/0060105 A1* | 3/2018 | Shimizu ............. G06F 9/45558 |
| 2020/0274591 A1* | 8/2020 | Kumar .................. H04W 16/24 |
| 2022/0376747 A1* | 11/2022 | Liu .......................... H04B 7/10 |

FOREIGN PATENT DOCUMENTS

CN    110 972 170 A    4/2020

OTHER PUBLICATIONS

International Search Report and Written Opinion for PCT/US2021/062589 dated Mar. 17, 2022, all pages.

* cited by examiner

*Primary Examiner* — Margaret G Mastrodonato
(74) *Attorney, Agent, or Firm* — Kilpatrick Townsend & Stockton LLP

(57) ABSTRACT

Various arrangements for updating a radio unit (RU) of a cellular network are presented. A volume of cellular signals being handled by a first programmable processor of the RU and a second programmable processor of the RU may be analyzed. A determination can be made that one of the processors has sufficient available resources to handle the analyzed volume of cellular signals. The RU can cause cellular signals to be rerouted to one of the programmable processors while the other processor is taken offline for updating. The update process is performed such that UE in communication with the RU experience uninterrupted cellular network access.

16 Claims, 5 Drawing Sheets

CONTINUOUSLY ONLINE 5G RADIO UNIT SYSTEMS AND METHODS

CROSS REFERENCES TO RELATED APPLICATIONS

This application claims priority to U.S. Provisional Patent Application No. 63/123,898, filed on Dec. 10, 2020, entitled "5G Radio Unit Processing Systems and Methods," the entire disclosure of which is hereby incorporated by reference for all purposes.

BACKGROUND

Cellular network users expect network access to be continuously available. Cellular network access can be more than a convenience—access to communication services, including contacting emergency services, can be a life or death matter. Further, as cellular networks offer significantly improved performance, such as with the advent of 5G NR (New Radio) cellular networks, a greater number of devices will use cellular networks to communicate with cloud-based servers and will function more effectively with continuous network access. Therefore, even if the cellular network is only temporarily unavailable during a time when network traffic is low, such as in the middle of the night, significant disruptions to users can occur. Therefore, users and equipment can benefit from more continuous cellular network access.

SUMMARY

Various embodiments are described related to a cellular network radio unit. In some embodiments, a cellular network radio unit is described. The unit may comprise a first programmable processor that performs digital signal processing on cellular signals used for communication with user equipment (UE) of a cellular network. The unit may comprise a second programmable processor that performs digital signal processing on cellular signals used for communication with UE of the cellular network. The unit may comprise a management processor, that may be in communication with the first programmable processor and the second programmable processor, configured to manage communication between a distributed unit (DU) of the cellular network, the first programmable processor, and the second programmable processor. The management processor may be configured to cause cellular signals to be rerouted to the second programmable processor instead of the first programmable processor. The management processor may be configured to cause the first programmable processor to initiate an update process. While the first programmable processor may be performing the update process, the first programmable processor may not process cellular signals. The second programmable processor may process the cellular signals rerouted to the second programmable processor instead of the first programmable processor. The management processor may be configured to cause the cellular signals routed to the second programmable processor instead of the first programmable processor to be routed to the first programmable processor following the update process completing such that during the update process UE experienced uninterrupted cellular network access via the RU.

Embodiments of such a cellular network radio unit may include one or more of the following features: the unit may further comprise an RF interface that may comprise a plurality of RF front ends; a plurality of duplexers; and a plurality of converters and modulators. The unit may further comprise a routing controller. The routing controller may alter electrical connections between: the RF interface; and the first programmable processor and the second programmable processor. The routing controller may be electrically connected with the management processor to allow the management processor to alter the electrical connections. The RU may function as part of a gNodeB of a 5G New Radio (NR) cellular network. Routing cellular signals from the first programmable processor to the second programmable processor may comprise the second programmable processor being electrically connected with an additional antenna via an RF front end. Routing cellular signals from the first programmable processor to the second programmable processor may cause the second programmable processor to process an additional carrier frequency. The management processor may be further configured to receive a command from the distributed unit to initiate the update process. The management processor may be further configured to analyze a volume of cellular signals being handled by the first programmable processor and second programmable processor. The management processor may be further configured to: determine, based on the volume of cellular signals being handled by the first programmable processor and second programmable processor, that the second programmable processor has sufficient available resources to handle the volume of cellular signals and maintain excess cellular signal processing capacity.

In some embodiments, a cellular network is described. The cellular network may comprise a cellular core implemented on a cloud-computing platform. The network may comprise a plurality of virtual centralized units (CU) implemented on the cloud-computing platform. The network may comprise a plurality of distributed units (DUs) that may be in communication with the plurality of virtual CUs. The network may comprise a plurality of radio units (RUs) that may be in communication with the plurality of DUs. Each RU of the plurality of RUs may comprise a first programmable processor that performs digital signal processing on cellular signals used for communication with user equipment (UE). Each RU of the plurality of RUs may comprise a second programmable processor that may perform digital signal processing on cellular signals used for communication with UE. Each RU of the plurality of RUs may comprise a management processor, that may be in communication with the first programmable processor and the second programmable processor, configured to manage communication between a distributed unit (DU) of the cellular network, the first programmable processor, and the second programmable processor. The management processor may be configured to cause cellular signals to be rerouted to the second programmable processor instead of the first programmable processor. The management processor may be configured to cause the first programmable processor to initiate an update process. While the first programmable processor may be performing the update process, the first programmable processor may not process cellular signals. The second programmable processor may process the cellular signals rerouted to the second programmable processor instead of the first programmable processor. The management processor may be configured to cause the cellular signals routed to the second programmable processor instead of the first programmable processor to be routed to the first programmable processor following the update process completing such that during the update process UE experienced uninterrupted cellular network access via the RU.

Embodiments of such a cellular network may include one or more of the following features: the management processor may be further configured to receive a command from the distributed unit to initiate the update process. The management processor may be further configured to analyze a volume of cellular signals being handled by the first programmable processor and second programmable processor. The management processor may be further configured to: determine, based on the volume of cellular signals being handled by the first programmable processor and second programmable processor, that the second programmable processor has sufficient available resources to handle the volume of cellular signals and maintain excess cellular signal processing capacity. The cellular network may be a 5G New Radio (NR) cellular network.

In some embodiments, a method for updating a radio unit (RU) of a cellular network is described. The method may comprise receiving, by the RU, from a distributed unit (DU) of the cellular network, an update request. The method may comprise, in response to the update request, analyzing a volume of cellular signals being handled by a first programmable processor of the RU and a second programmable processor of the RU. The method may comprise determining, by the RU based on the analyzed volume of cellular signals being handled by the first programmable processor and second programmable processor, that the second programmable processor has sufficient available resources to handle the analyzed volume of cellular signals and maintain excess cellular signal processing capacity. The method may comprise causing, by the RU, cellular signals to be rerouted to the second programmable processor instead of the first programmable processor. The method may comprise causing, by the RU, the first programmable processor to initiate an update process. While the first programmable processor may be performing the update process, the first programmable processor may not process cellular signals. The second programmable processor may process the cellular signals rerouted to the second programmable processor instead of the first programmable processor. The method may comprise causing, by the RU, the cellular signals routed to the second programmable processor instead of the first programmable processor to be routed to the first programmable processor following the update process completing such that during the update process UE experienced uninterrupted cellular network access via the RU.

Embodiments of such a method may include one or more of the following features: causing the cellular signals to be rerouted to the second programmable processor instead of the first programmable processor may comprise altering electrical connections between: an RF interface; and the first programmable processor and the second programmable processor using a routing controller. Determining that the second programmable processor has sufficient available resources to handle the analyzed volume of cellular signals and maintain excess cellular signal processing capacity may comprise comparing the analyzed volume to a predefined threshold volume. The method may further comprise requesting, by a management processor of the RU from the first programmable processor, a plurality of states corresponding to cellular signals being processed by the first programmable processor. The method may further comprise sending, by the first programmable processor, the plurality of states to the management processor. The method may further comprise sending, by the management processor, the plurality of states along with an adoption request to the second programmable processor. The method may further comprise adopting, by the second programmable processor, the plurality of states in response to the adoption request. The cellular network may be a 5G New Radio (NR) cellular network.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
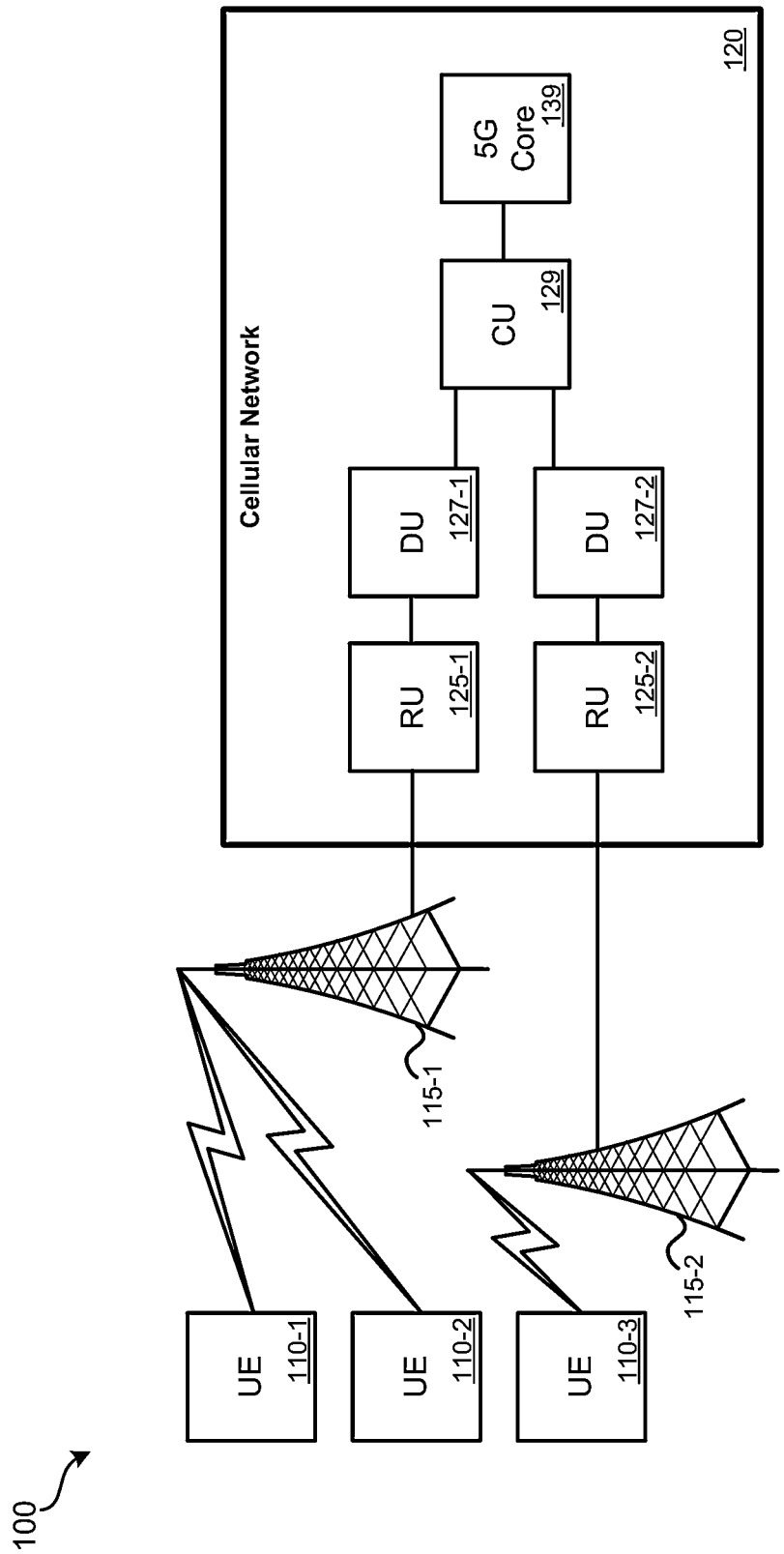
FIG. 1 illustrates an embodiment of a 5G New Radio (NR) Cellular Network.

Despite cellular carriers and cellular network users being desirous of cellular networks being continuously available, there can be times when a portion of the cellular network is intentionally or unintentionally made unavailable. For instance, if a component of the cellular network needs to be updated, such as firmware or software executed by a programmable processor, the component that includes the programmable processor may need to be temporarily taken offline for the update to be performed.

An RU may include multiple programmable processors that manage communications using one or more carrier frequencies and one or more antennas. Each programmable processor may manage communications with user equipment (UE) on one or more different carrier frequencies. These programmable processors can operate for extended periods of time with little or no downtime. Occasionally the firmware or software being executed by these programmable processors needs to be updated. To do so in a conventional cellular network arrangement, the RU may be taken offline for a period of time. While the RU is offline, each programmable processor may be reconfigured with new firmware or software. This procedure can involve powering off each programmable processor and reconfiguring each programmable processor with the updated or new firmware or software. Once the programmable processors have been reconfigured, the RU can be brought back online.

In contrast, embodiments detailed herein can allow an RU to remain continuously online and provide cellular service to UE while the firmware or software of multiple on-board programmable processors is updated serially. At a specific time when cellular network traffic through the RU is known to be low (e.g., 1 AM-4 AM) and/or based on cellular network traffic at a particular DU and/or RU being measured and possibly compared to a predefined threshold value, a determination can be made as to if a first programmable processor has sufficient processing resources to handle all communication traffic for the RU (or at least sufficient processing resources to handle all communications handled by the programmable processor plus an additional programmable processor). While this first programmable processor may typically process communications with UE for one or more carrier frequencies via one or more antennas, the determination may be made that this first programmable processor has sufficient processing resources to handle processing communications with UE typically handled by this first programmable processor and a second programmable processor (which may handle one or more other carrier frequencies and/or one or more other antennas of the base station) that is to have new firmware or software installed.

If the first programmable processor has sufficient resources (possibly plus a buffer amount of excess processing resources in case additional demand occurs during the update process), processing typically handled by the second programmable processor may be performed by the first programmable processor (in addition to the processing of cellular signals handled by the first programmable processor during normal operation). While the first programmable processor is handling processing of cellular signals typically handled by the first and second programmable processors, the second programmable processor can be taken offline and reconfigured with new or updated firmware or software.

Once the second programmable processor is fully reconfigured, the process may be repeated such that processing typically handled by the first programmable processor is performed by the second programmable processor (in addition to the processing handled by the second programmable processor during normal operation). While the second programmable processor processes all cellular signals with UE handled by the first and second programmable processors during normal operation, the first programmable processor is taken offline, reconfigured with the new or updated firmware or software, then brought back online. Additional rounds of updates can be performed based on the number of configurable processors present in the RU. For instance, two additional rounds of transferring the processing load may be performed if four programmable processors are present in an embodiment of a RU.

By this process being performed with each programmable processor serially, the RU can remain online continuously, albeit with a reduced capacity for processing cellular signals exchanged with UE. Since the process is performed at a time when cellular traffic with the RU is low, from the perspective of the UE that are communicating with the RU, no (or no meaningful) degradation in quality of service (QoS) with the cellular network either upstream or downstream may occur.

Further detail regarding these and other embodiments are detailed in relation to the figures. FIG. 1 illustrates an embodiment of a cellular network system 100 ("system 100"). System 100 can include a 5G New Radio (NR) cellular network or other types of cellular network (e.g., 4G LTE, future 6G and beyond cellular networks). System 100 can include: UE 110 (UE 110-1, UE 110-2, UE 110-3); base station 115; cellular network 120; radio units 125 ("RUs 125"); distributed units 127 ("DUs 127"); centralized unit 129 ("CU 129"); 5G core 139, and microcell deployment system 140. FIG. 1 represents a component level view. In an open radio access network (O-RAN), because components can be implemented as software on a cloud-computing platform, except for components that need to receive and transmit RF, the functionality of the various components can be shifted among different servers and/or data centers to accommodate where the functionality of such components is needed and/or where processing, storage, and/or bandwidth is available.

A cloud-computing platform, such as one operated by a third-party cloud-service provider that provides cloud computing and storage services for various entities, may be used to implement some or all of components of 5G core 139; CU 129; and/or DUs 127. In a real-world implementation, many more UE, base stations 115; RUs 125; DUs 127; and CUs 129 may be present and in communication with 5G core 139.

UE 110 can represent various types of end-user devices, such as smartphones, cellular modems, cellular-enabled computerized devices, sensor devices, gaming devices, access points (APs), any computerized device capable of communicating via a cellular network, etc. Depending on the location of individual UE, UE 110 may use RF to communicate with various base stations (BSs) of cellular network 120. As illustrated, two base stations 115 (BS 115-1, 115-2) are illustrated. A BS can include at least one RU, one or more antennas, and a structure on which to mount the one or more antennas. Real-world implementations of system 100 can include many (e.g., thousands) of base stations, RUs, DUs, and CUs. BS 115 can include one or more antennas that allow RUs 125 to communicate wirelessly with UE 110. RUs 125 can represent an edge of cellular network 120 where data is transitioned to wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture. Base station equipment 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of spectrum, such as, for example, band n71. One or more DUs, such as DU 127-1, may communicate with CU 129. Collectively, RUs, DUs, and CUs create a gNodeB, which serves as the radio access network (RAN) of cellular network 120. CU 129 can communicate with 5G core 139. The specific architecture of cellular network 120 can vary by embodiment. Edge cloud server systems (not illustrated) outside of cellular network 120 may communicate, either directly, via the Internet, or via some other network, with components of cellular network 120.

Multiple slices may function on the underlying hardware detailed in FIG. 1. That is, UE 110-1 and UE 110-2, while communicating with the same base station, may be provided with different QoS/QoE levels of service by virtue of being assigned to different slices. Each slice may be associated with differing performance characteristics. For each slice, many characteristics or parameters may be defined, such as: downlink/uplink throughput (aggregate for network slice); downlink/uplink throughput (per UE); maximum downlink/uplink throughput; maximum supported packet size; mission critical level (e.g., compared to other network slices); radio spectrum; packet error rate; supported access technologies; supported device velocity for a defined QoS; uplink throughput (aggregate for network slice); maximum uplink throughput; and/or synchronicity. Other parameters for a slice may also be defined, such as: a defined latency range for specific end-points; reserved or shared spectrum; one or more particular security profiles; optimization for specific applications or sets of applications (e.g., healthcare applications, industrial applications); optimization for high-speed mobility; and varying degrees of customer-side control of network parameters. Other parameters may also be defined, such as parameters for individual layers within each network slice. Such individual layers may allow for particular types of data or data associated with particular applications to be prioritized over other applications.

Figure 2:
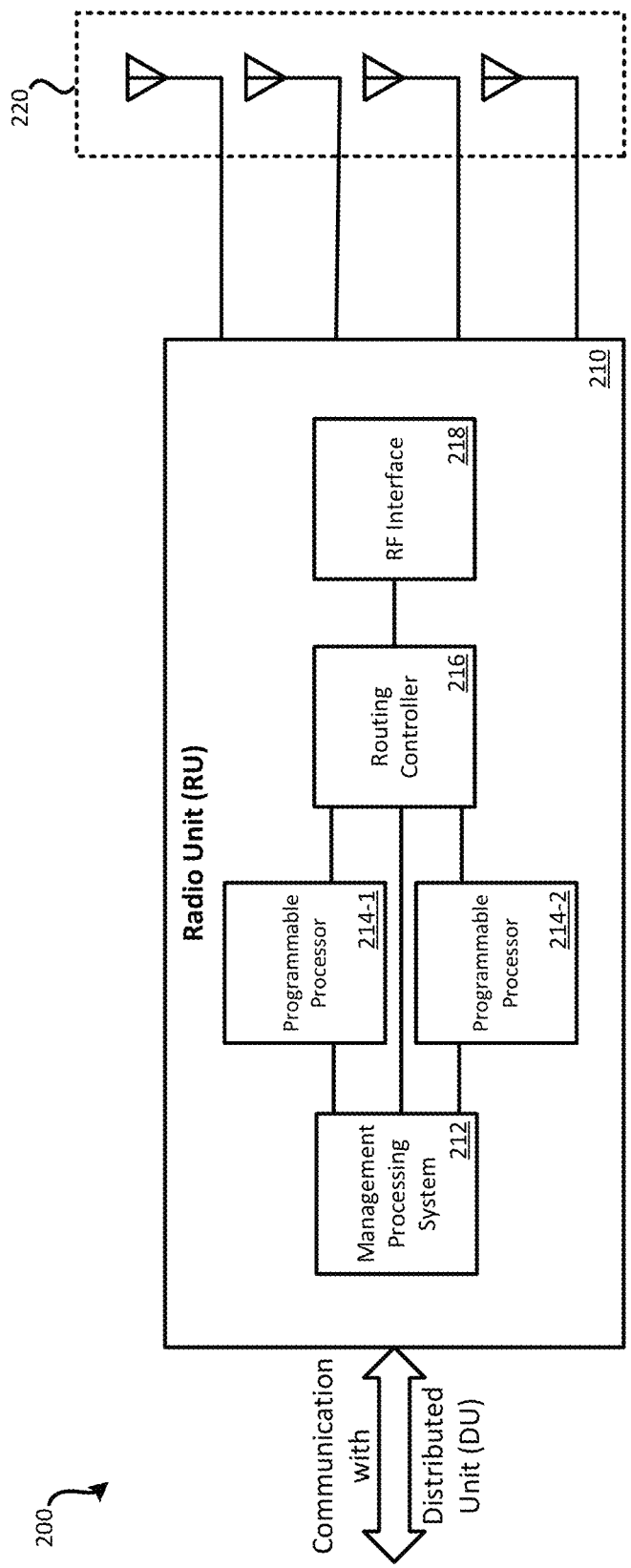
FIG. 2 illustrates a block diagram of an embodiment of a radio unit (RU) in communication with components of a cellular network.

FIG. 2 illustrates a block diagram of an embodiment 200 of radio unit (RU) 210 functioning as part of a cellular network. RU 210 can represent an embodiment of an RU of RUs 125. In the illustrated portion of embodiment 200, an RU 210 communicates with a distributed unit (DU). Depending on the architecture of the cellular network, the specific functions performed by the DU and RU can vary. For example, in different architectures, some functions may be performed by the DU, but in other architectures those same functions may be performed by the RU. For 5G NR cellular networks built to standards to set forth by 3GPP and the O-RAN (Open Radio Access Network) Alliance may provide cellular carriers with various options on how and where certain functionality can be implemented within their cellular networks.

RU 210 of FIG. 2 can include: management processing system 212; programmable processors 214 (e.g., 214-1, 214-2); routing controller 216; and RF interface 218. RU 210 may be in communication with some number of antennas, such as antennas 220. These antennas may be used to communicate on different carrier frequencies and/or may be pointed in different geographic directions and/or with different orientations. Management processing system 212 may include one or more processors. Some or all of these processors may be reconfigurable. For instance, management processing system 212 may include one or more programmable processors, such as field programmable gate arrays (FPGAs) and/or structured application specific integrated circuits (e.g., eASICs®). Management processing system 212 may include (or may communicate with a separate processor system) that performs eCPRI (enhanced common public radio interface) functions. Management processing system 212 may further provide access to communications, memory, and logic for programmable processors 214. Management processing system 212 can control the routing of cellular signals via routing controller 216. Management processing system 212 can further control updating of programmable processors 214 as detailed herein.

Programmable processors 214 may each be some form of a programmable processor, such as FPGAs and/or structured ASICs. Such programmable processors may be reprogrammable to lesser or greater degrees. For instance, an FPGA may be fully configured using new firmware or software; however, the amount of reconfiguration available for a structured ASIC may be significantly less. It can also be possible that one of programmable processors 214 is one type of programmable processor (e.g., FPGA) and another programmable processor of programmable processors 214 is another type of programmable processor (e.g., structured ASIC). Other forms of programmable processors are also possible, such as programmable digital signal processing (DSP) components. Programmable processors 214 may each generally perform processing on data received from and to be transmitted to user equipment (UE). Multiple programmable processors 214 may be present to increase the amount of raw processing power available, such as 2, 3, 4, 5, or 6 programmable processors. For example, the greater amount of total processing power available in programmable processors 214 may at least in part define the number of UE with which RU 210 can have an active communication session. For instance, for each UE that is attempting to communicate with the cellular network, some amount of processing may be required to be performed on data/signals exchanged between the DU (that is in communication with the RU) and the UE.

Depending on the architecture of RU 210, during normal operation (i.e., when both programmable processors 214 are performing processing and are not being updated), each programmable processor may be assigned to process cellular signals for different carrier frequencies and/or different antennas. Alternatively, each programmable processor may be assigned to handle the processing for at least some of the same carrier frequencies, but may perform processing for cellular signals received and sent via different antennas.

In the illustrated example of the portion of embodiment 200, two programmable processors 214 are present. In other embodiments, more than two programmable processors 214 may be present. In embodiments detailed herein, processing performed by one programmable processor during normal operation is reassigned to another programmable processor. In some embodiments, if more than two programmable processors are present, the processing performed by the one programmable processor during normal operation is divided (not necessarily equally) and reassigned to multiple other programmable processors. As an example, if an RU has three programmable processors, when the first processor is taken offline for updating, the other two processors that remain online split the processing functions previously being performed by the first. Further detail regarding the functions that can be performed by programmable processors 214 is provided in relation to FIG. 2.

Between programmable processors 214 and RF interface 218, a routing controller 216 is present. Routing controller 216 can be in communication with management processing system 212. Routing controller 216 can control which components of RF interface 218 are in communication with which programmable processor of programmable processors 214. Components of RF interface 218 can be connected with a particular antenna of antennas 220. RF interface 218 can include circuitry that performs mixing on the receive and/or transmit side and can include one or more power amplifiers to amplify signals to be transmitted using one or more of antennas 220. The number of antennas 220 illustrated can be arbitrary; embodiments can include one or more antennas. During normal operation, for example, programmable processor 214-1 may always handle processing for communications with UE via a first and second antenna, while programmable processor 214-2 may always handle processing for communications with UE via a third and fourth antenna. Routing controller 216, based on instructions from management processing system 212, can temporarily reroute communications such that the other programmable processor is in communication with components of RF interface 218 that are only in communication with the other programmable processor during normal operation.

Figure 3:
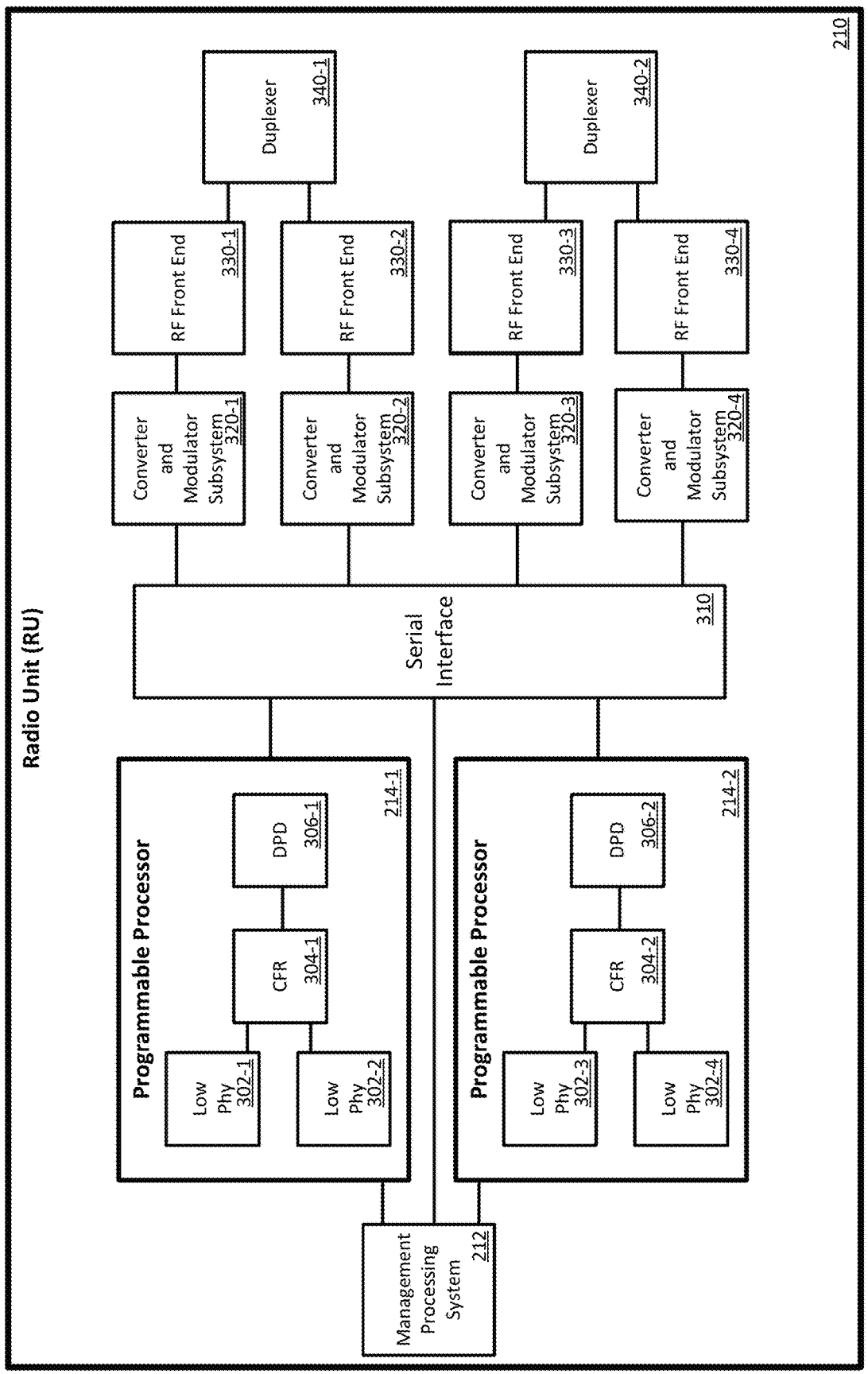
FIG. 3 illustrates a block diagram of an embodiment of an RU.

FIG. 3 illustrates a more detailed block diagram of an embodiment of RU 210. Management processing system 112 may function as detailed in relation to FIG. 2. Programmable processors, such as programmable processors 214-1 and 214-2, may perform specific signal processing functions. The specific signal processing functions, may vary on the specific architecture of the cellular network that is implemented. For example, for 5G NR cellular networks, specific functions may be performed by the DU instead of the RU depending on architecture. In the example of FIG. 3, each programmable processor, such as programmable processor 114-1, includes digital signal processing components such as: two low PHY (low physical layer) components (low PHY components 302-1, 302-2); crest factor reduction (CFR) component 304-1, and digital predistortion (DPD) component 306-1. Each of these components can be implemented as a set of instructions that are used to configure programmable processor 114-1. If an FPGA is used as programmable processor 114-1, each of these components may be created as firmware or software that is used to configure the gates of the FPGA to perform the processing.

Low PHY 302-1 may perform functionality including: digital beam-forming, fast Fourier transforms, inverse fast Fourier transforms, IQ composition, IQ decomposition, precoding, channel filtering, CP removal, CP addition, PRACH filtering, and precoding. Low PHY 302-1 may be for uplink transmissions (from the UE to the DU); Low PHY 302-2 may perform similar functions for downlink transmissions (from DU to the UE). CFR 304-1 may perform crest factor reduction on signals to be transmitted to UE. Crest factor reduction may modify signals to be transmitted to be in a form better suited to amplification by a power amplifier. More specifically, CFR is a technique used to reduce the PAPR (peak to average power ratio) of a signal so that a power amplifier can operate more efficiently. DPD 306-1 can perform digital pre-distortion filtering to reduce the amount of out-of-band emissions and can help linearize signals for amplification by a power amplifier. Therefore, the amount of processing performed by programmable processor 114-1 may be significantly based on the amount of data being transmitted/received with UE and/or the number of UE actively communicating with programmable processor 114-1. Programmable processor 114-2 may perform the same functions as programmable processor 114-1 for different UE; these different UE may be communicating using the same or different carrier frequencies and/or the same or different antennas.

Serial interface 310 may function as routing controller 116. Specifically, serial interface 310 can control which converter and modulator subsystems 320 are electrically connected (or in communication with) which programmable processor of programmable processors 114. Serial interface 310 can be understood as a set of switches that alters which programmable processor is connected to which converters and modulators. Serial interface 310 receives instructions or signals from management processing system 212. These instructions or signals control which converter and modulator subsystems 320 are connected to which programmable processors of programmable processors 214. During normal operation, in which all programmable processors 114 are functioning and no processor is offline to be updated or modified, converters and modulator subsystems 320-1 and 320-2 may be in communication with programmable processor 114-1; converters and modulator subsystems 320-3 and 320-4 may be in communication with programmable processor 214-2. During an update operation, a single programmable processor may be in communication with all converters and modulator subsystems 320 and the other programmable processor may be not in communication with any converters and modulators.

Converter and modulator subsystem 320 may be hardwired with respective RF front end components of RF front ends 330. For example, RF front end 330-1 may always be connected with converter and modulator subsystem 320-1 and is not reconfigurable. A converter may perform a digital to analog conversion for signals to be transmitted to UE or may perform an analog to digital conversion for signals being received from UE. IQ modulation/demodulation can also be performed by each converter and modulator subsystem. A single RF integrated circuit may include multiple converter and modulator subsystems. RF front ends 330 can include circuitry that performs mixing on the receive and/or transmit side and can include one or more power amplifiers to amplify signals to be transmitted using an antenna. Each duplexer of duplexers 340 can serve to combine and separate receive and transmit signals. Each duplexer of duplexers 340 may be connected to specific one or more antennas. For instance, converter and modulator subsystems 320-1 and RF front end 330-1 may perform processing on received signals from UE while converter and modulator subsystem 320-2 and RF front end 330-2 may perform processing on signals being transmitted to UE.

In some architectures, a particular programmable processor may handle a particular carrier frequency or frequencies and other programmable processors may handle one or more other carrier frequencies. During an update, a single programmable processor, such as programmable processor 114-1, may handle all the carrier frequencies that would be handled by the two programmable processors during normal operation. Alternatively, UE may be instructed to change carrier frequency such that the programmable processor that remains operational continues to handle the same one or more carrier frequencies, but now performs processing for additional UE that have changed carrier frequency.

Figure 4A:
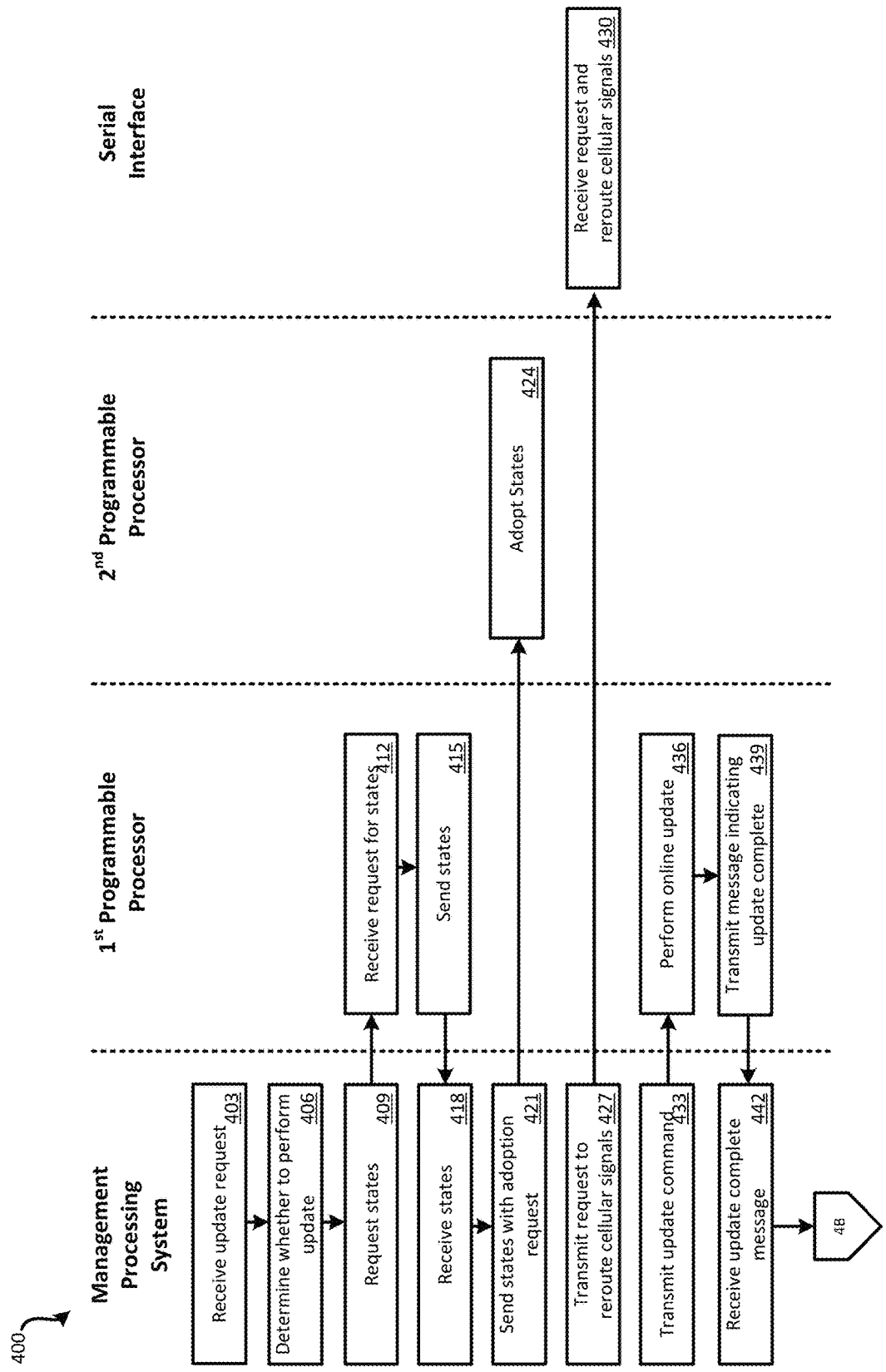
FIG. 4A and FIG. 4B illustrate an embodiment of a method for updating firmware or software of an RU of a cellular network.
Figure 4B:
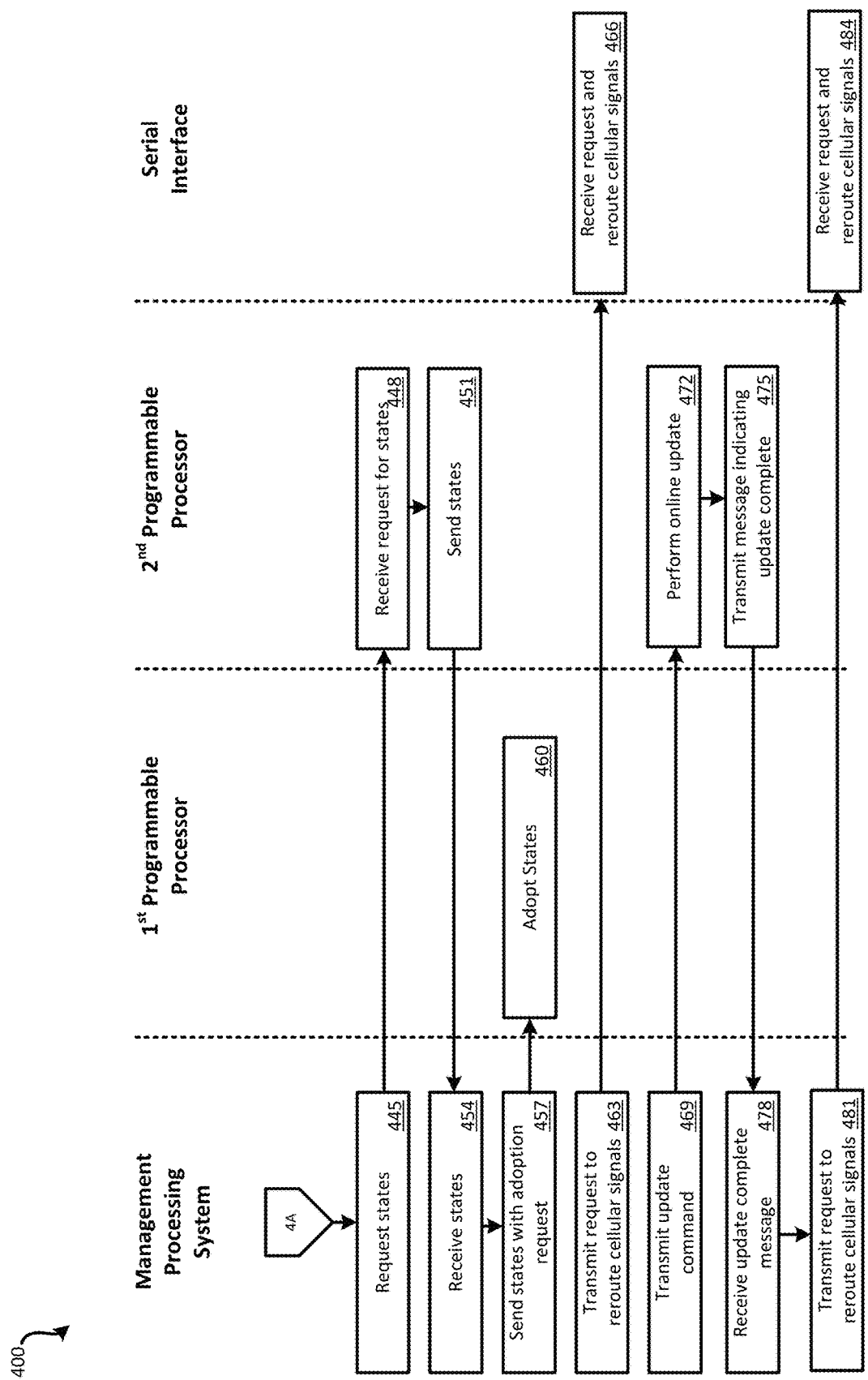

Various methods may be performed using the devices and systems of FIGS. 1-3. FIGS. 4A and 4B illustrate an embodiment of a method 400 for updating firmware or software of an RU of a cellular network while allowing the RU to stay online providing cellular service to UE. Each block of method 400 may be performed by a component of an RU, such as RU 210 of FIGS. 2 and 3. Management processing system can refer to management processing system 212. First programmable processor can refer to programmable processor 214-1 or programmable processor 214-2. Second programmable processor can refer to the other programmable processor of programmable processors 214. Serial interface can refer to serial interface 310 or routing controller 216 of FIG. 1.

In some embodiments, a single monolithic programmable processor may be partially reconfigured while other portions of the programmable processor continues functioning in a normal operating mode. Method 400 may be applied to such processors to serially update first and second portions of such a processor. For example, a partially reconfigurable FPGA may be used that is partitioned into a first section and a second section. Each of these sections may function independently (similar to separate reprogrammable processors). Method 400 may be applied to such a processor to allow each section to be updated serially.

Prior to block 403, both the first and second programmable processors may be functioning in a normal operating mode. In a normal operating mode, both programmable processors may be performing processing of upstream and/or downstream cellular signals, such as the functions detailed in relation to components 302, 304, and/or 306. Beginning on FIG. 4A at block 403, an update request may be received by the management processing system. The update request may be generated and received from a DU in communication with the RU. The request may also be generated by some other component of the core network of the cellular network or may originate outside of the cellular network itself. In some embodiments, the request is sent at a time when usage of the RU is expected to be low, such as between 1 AM and 4 AM. In some embodiments, the request is generated based upon the DU or some other component determining that a sufficiently low volume of communication with UE is occurring via the RU such that a programmable processor can be taken offline for a time without service provided to the UE being interrupted. For example, if two programmable processors are present, the DU (or some other component) may determine that the RU is functioning at less than 50% capacity. Additionally, a buffer amount of capacity may be maintained to account for potential increases in traffic during an update. For instance, an additional 10% of capacity may be used as a buffer to ensure that the programmable processor that remains online has sufficient resources to provide UE with service.

In some embodiments, the determination as to whether the update should proceed is made by the RU, such as the management processing system, in response to receiving the update request. At block 406, the management processing system may determine the processing load of each of the programmable processors. The update may be held in abeyance until the management processing system determines that the processing load of the programmable processors is sufficiently low enough, such as below a predefined threshold processing load value, that a programmable processor can be taken offline while the other one or more programmable processors perform processing for UE. When the update is to proceed, block 406 proceeds to block 409.

At block 409, the management processing system requests the operating states of the first programmable processor, which is the programmable processor to be updated with new or updated firmware or software. The operating states are used to recreate the present and future states of the machine. For example, the memory state of the DPD, referred to as the channel filter estimate, evolves over time due to fading. At block 412, the request for states may be received by the first programmable processor. The states may be sent at block 415 from the memory of the first programmable processor. The states may be received at block 418 by the management processing system. In some embodiments, the first programmable processor may send the states directly to the second programmable processor rather than through the management processing system.

At block 424, the second programmable processor, which is the programmable processor that will temporarily handle the processing previously handled by the first programmable processor while the first programmable processor is offline, adopts the states of the first programmable processor at block 424. Once adopted, in some embodiments, an acknowledgment message is sent to the management processing system.

At block 427, possibly in response to the acknowledgment message, the management processing system then sends a signal or request for cellular signals between the first programmable processor and the converter and modulator components of the RU to be rerouted to the second programmable processor. The signal or request is received and implemented by the serial interface at block 430. Since the second programmable processor has adopted the states of the first programmable processor, the cellular signals can be seamlessly processed without a disruption in service for the UE. In some embodiments, the serial interface sends an acknowledgment back to the management processing system. In other embodiments, the serial interface may be a bank of switches that are controlled by the management processing system.

At this point, the first programmable processor is no longer processing cellular signals for UE. Cellular signals for UE are being processed through the second programmable processor and service to the UE previously serviced by the first programmable processor remains uninterrupted.

At this point, an update process of the first programmable processor can begin. At block 433, an update command may be sent by the management processing system to the first programmable processor. This may cause the first programmable processor to restart and load a new set of firmware or software at block 436. The new firmware or software may be stored in a memory accessible by the first programmable processor. The new firmware or software has been previously downloaded to the memory, such as from the DU. This download may have occurred at any time earlier, such as prior to block 403.

The first programmable processor may be offline for a period of time, such as seconds, minutes, or hours in order to load the new firmware or software. Once the new firmware or software is loaded and the first programmable processor has been reconfigured, a message indicating that the update is complete may be sent to the management processing system at block 439. At block 442, the management processing system receives the update complete message.

In some embodiments, once the first programmable processor is updated, the states for the UE that are to be processed by the first programmable processor during normal operation are obtained and loaded from the second programmable processor. The cellular signals may then be rerouted so that normal operation occurs, with the UE associated with particular frequencies, and/or antennas being processed by the first and second programmable processors. Therefore, in some embodiments, blocks 445-466 are performed, but only for UE that are to be serviced by the first programmable processor during a normal operation mode. In some embodiments, the method may end here: with a single programmable processor being updated or modified and normal operation then resuming. Alternatively, as detailed below, if sufficient processing resources are available, an update of the second programmable processor may be performed following an update of the first programmable processor.

Method 400 continues on FIG. 4B. In some embodiments, a second determination may be performed to determine whether the RU has sufficient processing resources to allow the second reprogrammable processor to be taken offline. For instance, if the amount of cellular signals being processed has increased during the update of the first reprogrammable processor, a sufficient buffer of available processing resources may no longer be available and an update of the second programmable processor may be postponed until the amount of available processing resources increases. If sufficient resources are available, method 400 may proceed to block 445. Alternatively, the update process may proceed without a second determination as to availability of processing resources.

At block 445, the management processing system requests the operating states of the second programmable processor, which is the programmable processor to now be updated with new or updated firmware or software (which may be the same firmware or software used to update the first programmable processor or different firmware or software). The states requested at block 445 may be the states currently used for processing of all the cellular signals of the RU (assuming the RU includes only the two programmable processors) if the second programmable processor is updated immediately following the update of the first programmable processor, since the second programmable processor was temporarily handling processing of the cellular signals typically handled by the first programmable processor while the first programmable processor was performing the update process. At block 448, the request for states may be received by the second programmable processor. The states may be sent at block 451 from the memory of the second programmable processor. The states may be received at block 454 by the management processing system. In some embodiments, the second programmable processor may send the states directly to the first programmable processor rather than through the management processing system.

At block 457, the first programmable processor, which is the programmable processor that will handle the processing previously handled by the second programmable processor while the second programmable processor is offline, adopts the states of the second programmable processor at block 460. Once adopted, in some embodiments, an acknowledgment message can be sent to the management processing system.

At block 463, possibly in response to the acknowledgment, the management processing system then sends a signal or request for cellular signals between the second programmable processor and the converter and modulator subsystems of the RU to be rerouted to the first programmable processor. The signal or request is received and implemented by the serial interface at block 466. Since the first programmable processor has adopted the states of the second programmable processor, the cellular signals can be seamlessly processed without a disruption in service for any of the UE. In some embodiments, the serial interface sends an acknowledgment back to the management processing system. In other embodiments, the serial interface may be a bank of switches that are controlled by the management processing system.

At this point, the second programmable processor is no longer processing cellular signals for UE. Cellular signals for UE are being processed through the first programmable processor (that has been updated with the new firmware or software) and service to the UE through the RU remains uninterrupted. At this point, an update process of the second programmable processor can begin. At block 469, an update command may be sent by the management processing system to the second programmable processor. This may cause the second programmable processor to restart and load a new set of firmware or software at block 472. The new firmware or software may be stored in a memory accessible by the second programmable processor. The new firmware or software has been previously downloaded to the memory, such as from the DU. This download may have occurred at any time earlier, such as prior to block 403.

The second programmable processor may be offline for a period of time, such as seconds, minutes, or hours in order to load the new firmware or software. Once the new firmware or software is loaded and the first programmable processor has been reconfigured, a message indicating that the update is complete may be sent to the management processing system at block 475. At block 478, the management processing system receives the update complete message. Once complete, states relevant to the cellular signals that will now be processed using the second programmable processor may be obtained from the first programmable processor and used to configured the second programmable processor. At block 481, possibly in response to the message of block 475, the management processing system then sends a signal or request for cellular signals between the first programmable processor and the converter and modulator components of the RU to be rerouted such that certain RF components are in communication with the first programmable processor and other RF components are in communication with the second programmable processor. The signal or request is received and implemented by the serial interface at block 466. Now that both reprogrammable processors have been updated, normal operation can resume with each programmable processor being used to perform processing of cellular signals for the same or different carrier signals and/or different antennas of a base station.

Throughout method 400, the RU as a whole remains functional for processing of cellular signals between a DU and UE with only one processor going offline at a time. Therefore, from the point of view of the DU and the UE, the RU remains fully functional and the UE can continue to access the cellular network. The primary difference during method 400 is the total processing capacity of the reprogrammable processors is decreased; therefore the total number of UE and/or the total amount of cellular signals that can be processed concurrently by the RU is decreased. However, if the update is performed at a time of low cellular traffic, this decrease in total processing capacity can be moot.

In addition to transferring processing of cellular signals to allow for a programmable processor to be temporarily taken offline for update of firmware or software, similar arrangements may be used to transfer processing of cellular signals for other purposes. For example, if a reprogrammable processor suffers a failure, processing of cellular signals can be transferred to one or more other reprogrammable processors. Therefore, rather than receiving an update request, an indication of a processor fault may serve as a trigger to initiate transfer of processing of cellular signals to a different programmable processor. While method 400 is focused on an arrangement in which two reprogrammable processors are present, the blocks of method 400 can be extended to arrangements involving three or more reprogrammable processors, with processing of cellular signals being temporarily reassigned to one or split among multiple other reprogrammable processors. Further, it may be possible that one or more of the reprogrammable processors can execute one or more RAN (radio access network) intelligent controller (RIC) type applications. Similar to the digital signal processing of cellular signals being handed off between reprogrammable processors, the execution and states of RIC applications can be handed off between reprogrammable processors. An example can be a parameter change in the transmission method that necessitates processors being taken offline, such as a change in the sub-carrier spacing.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A cellular network radio unit, comprising:
   a first programmable processor that performs digital signal processing on cellular signals used for communication with user equipment (UE) of a cellular network;
   a second programmable processor that performs digital signal processing on cellular signals used for communication with UE of the cellular network;
   a management processor, that is in communication with the first programmable processor and the second programmable processor, configured to manage communication between a distributed unit (DU) of the cellular network, the first programmable processor, and the second programmable processor, wherein the management processor is configured to:
      cause cellular signals to be rerouted to the second programmable processor instead of the first programmable processor;
      cause the first programmable processor to initiate an update process, wherein:
         while the first programmable processor is performing the update process, the first programmable processor does not process cellular signals; and
         the second programmable processor processes the cellular signals rerouted to the second programmable processor instead of the first programmable processor; and
      cause the cellular signals routed to the second programmable processor instead of the first programmable processor to be routed to the first programmable processor following the update process completing such that during the update process UE experienced uninterrupted cellular network access via a radio unit (RU);
   a plurality of converter and modulator subsystems;
   a plurality of RF front ends, wherein each RF front end is connected with a converter and modulator subsystem of the plurality of converter and modulator subsystems;
   a plurality of duplexers connected with the plurality of RF front ends and one or more antennas; and
   a serial interface, which receives instructions from the management processor, that controls which of the plurality of converter and modulator subsystems are in communication with the first programmable processor and the second programmable processor.

2. The radio unit of claim 1, wherein the RU functions as part of a gNodeB of a 5G New Radio (NR) cellular network.

3. The radio unit of claim 1, wherein routing cellular signals from the first programmable processor to the second programmable processor comprises the second programmable processor being electrically connected with an additional antenna via an RF front end.

4. The radio unit of claim 1, wherein routing cellular signals from the first programmable processor to the second programmable processor causes the second programmable processor to process an additional carrier frequency.

5. The radio unit of claim 1, wherein the management processor is further configured to receive a command from the distributed unit to initiate the update process.

6. The radio unit of claim 5, wherein the management processor is further configured to analyze a volume of cellular signals being handled by the first programmable processor and the second programmable processor.

7. The radio unit of claim 6, wherein the management processor is further configured to: determine, based on the volume of cellular signals being handled by the first programmable processor and the second programmable processor, that the second programmable processor has sufficient available resources to handle the volume of cellular signals and maintain excess cellular signal processing capacity.

8. A cellular network, comprising:
   a cellular core implemented on a cloud-computing platform;
   a plurality of virtual centralized units (CU) implemented on the cloud-computing platform;
   a plurality of distributed units (DUs) that are in communication with the plurality of virtual CUs;
   a plurality of radio units (RUs) that are in communication with the plurality of DUs, wherein each RU of the plurality of RUs comprises:
      a first programmable processor that performs digital signal processing on cellular signals used for communication with user equipment (UE);
      a second programmable processor that performs digital signal processing on cellular signals used for communication with UE;
      a management processor, that is in communication with the first programmable processor and the second programmable processor, configured to manage communication between a distributed unit (DU) of the cellular network, the first programmable processor, and the second programmable processor, wherein the management processor is configured to:
         cause cellular signals to be rerouted to the second programmable processor instead of the first programmable processor;
         cause the first programmable processor to initiate an update process, wherein:
            while the first programmable processor is performing the update process, the first programmable processor does not process cellular signals; and
            the second programmable processor processes the cellular signals rerouted to the second programmable processor instead of the first programmable processor; and cause the cellular signals routed to the second programmable processor instead of the first programmable processor to be routed to the first programmable processor following the update process completing such that during the update process UE experienced uninterrupted cellular network access via the RU;
a plurality of converter and modulator subsystems;
a plurality of RF front ends, wherein each RF front end is connected with a converter and modulator subsystem of the plurality of converter and modulator subsystems;
a plurality of duplexers connected with the plurality of RF front ends and one or more antennas; and
a serial interface, which receives instructions from the management processor, that controls which of the plurality of converter and modulator subsystems are in communication with the first programmable processor and the second programmable processor.

9. The cellular network of claim 8, wherein the management processor is further configured to receive a command from the distributed unit to initiate the update process.

10. The cellular network of claim 9, wherein the management processor is further configured to analyze a volume of cellular signals being handled by the first programmable processor and the second programmable processor.

11. The cellular network of claim 10, wherein the management processor is further configured to: determine, based on the volume of cellular signals being handled by the first programmable processor and the second programmable processor, that the second programmable processor has sufficient available resources to handle the volume of cellular signals and maintain excess cellular signal processing capacity.

12. The cellular network of claim 10, wherein the cellular network is a 5G New Radio (NR) cellular network.

13. A method for updating a radio unit (RU) of a cellular network, the method comprising:
receiving, by the RU, from a distributed unit (DU) of the cellular network, an update request;
in response to the update request, analyzing a volume of cellular signals being handled by a first programmable processor of the RU and a second programmable processor of the RU;
determining, by the RU based on the analyzed volume of cellular signals being handled by the first programmable processor and second programmable processor, that the second programmable processor has sufficient available resources to handle the analyzed volume of cellular signals and maintain excess cellular signal processing capacity;
causing, by the RU, cellular signals to be rerouted to the second programmable processor instead of the first programmable processor, wherein
rerouting the cellular signals comprises using a serial interface, which receives instructions from a management processor of the RU, that controls which of a plurality of converter and modulator subsystems are in communication with the first programmable processor and the second programmable processor;
causing, by the RU, the first programmable processor to initiate an update process, wherein:
while the first programmable processor is performing the update process, the first programmable processor does not process cellular signals; and
the second programmable processor processes the cellular signals rerouted to the second programmable processor instead of the first programmable processor; and
causing, by the RU, the cellular signals routed to the second programmable processor instead of the first programmable processor to be routed to the first programmable processor following the update process completing such that during the update process UE experienced uninterrupted cellular network access via the RU.

14. The method of claim 13, wherein determining that the second programmable processor has sufficient available resources to handle the analyzed volume of cellular signals and maintain excess cellular signal processing capacity comprises comparing the analyzed volume to a predefined threshold volume.

15. The method of claim 13, further comprising:
requesting, by the management processor of the RU from the first programmable processor, a plurality of states corresponding to cellular signals being processed by the first programmable processor;
sending, by the first programmable processor, the plurality of states to the management processor;
sending, by the management processor, the plurality of states along with an adoption request to the second programmable processor; and
adopting, by the second programmable processor, the plurality of states in response to the adoption request.

16. The method of claim 13, wherein the cellular network is a 5G New Radio (NR) cellular network.

* * * * *